United States Patent [19]

Huang et al.

[11] Patent Number: 6,088,712

[45] Date of Patent: Jul. 11, 2000

[54] METHOD OF AUTOMATING THE MANIPULATION AND DISPLAYING OF SETS OF WAFER YIELD DATA USING A USER INTERFACE SMART MACRO

[75] Inventors: Kuang-Hua Ken Huang, Cupertino; Yong Zeng, Sunnyvale; Yu Zhang, Cupertino, all of Calif.

[73] Assignee: Knights Technology, Inc., Sunnyvale, Calif.

[21] Appl. No.: 08/994,996

[22] Filed: Dec. 19, 1997

Related U.S. Application Data

[63] Continuation of application No. 08/744,557, Nov. 6, 1996, abandoned, which is a continuation of application No. 08/403,146, Mar. 13, 1995, abandoned.

[51] Int. Cl.[7] .................................................. G06F 17/30
[52] U.S. Cl. ........................................ 707/526; 345/333
[58] Field of Search .................................. 707/502, 515, 707/517, 526; 345/333, 339

[56] References Cited

U.S. PATENT DOCUMENTS

| | | | |
|---|---|---|---|
| 5,252,951 | 10/1993 | Tannenbaum et al. | 345/156 |
| 5,287,514 | 2/1994 | Gram | 345/333 |
| 5,331,330 | 7/1994 | Susnjara | 342/460 |
| 5,335,342 | 8/1994 | Pope et al. | 714/38 |
| 5,343,409 | 8/1994 | Satterfield et al. | 709/223 |
| 5,367,667 | 11/1994 | Wahlquist et al. | 714/32 |
| 5,440,697 | 8/1995 | Boegel et al. | 395/500.42 |
| 5,448,739 | 9/1995 | Jacobson | 709/300 |
| 5,528,735 | 6/1996 | Strasnick et al. | 345/427 |
| 5,537,618 | 7/1996 | Boulton et al. | 345/326 |

OTHER PUBLICATIONS

Computer Dictionary, Microsoft Press, 1994, pp. 39 and 278.

*Primary Examiner*—Stephen S. Hong
*Attorney, Agent, or Firm*—Burns, Doane, Swecker & Mathis LLP

[57] ABSTRACT

An intelligent, state-based macro facility is provided (as opposed to the unintelligent keystroke macro facilities typical of the prior art). Instead of a record time and an end time, an intelligent, state-based macro, or "smart macro," has only a single "capture" time, determined by the user pressing a single "smart macro" key. The state of the application, including objects displayed and various properties or attributes of those objects, is then captured and stored under a name supplied by the user. That same state may then be applied to different data to produce the same kinds of results. The smart macro may be applied interactively by the user to different data, or different data sets. Even more advantageously, a batch job may be scheduled, in which the smart macro is scheduled to run on specified data at a specified time with the results being saved to disk under a user-specified name. Batch jobs may be scheduled as one-time jobs or recurring jobs. If desired, the capability may be provided to add time-based information streams, such as sound or even video, to the smart macro, with a time-based information stream object being embedded in the resulting document. For example, instead of annotating a report or attaching a later cover sheet or explanatory note to a report, a voice recording may be added to the report, for example, explaining its significance.

9 Claims, 11 Drawing Sheets

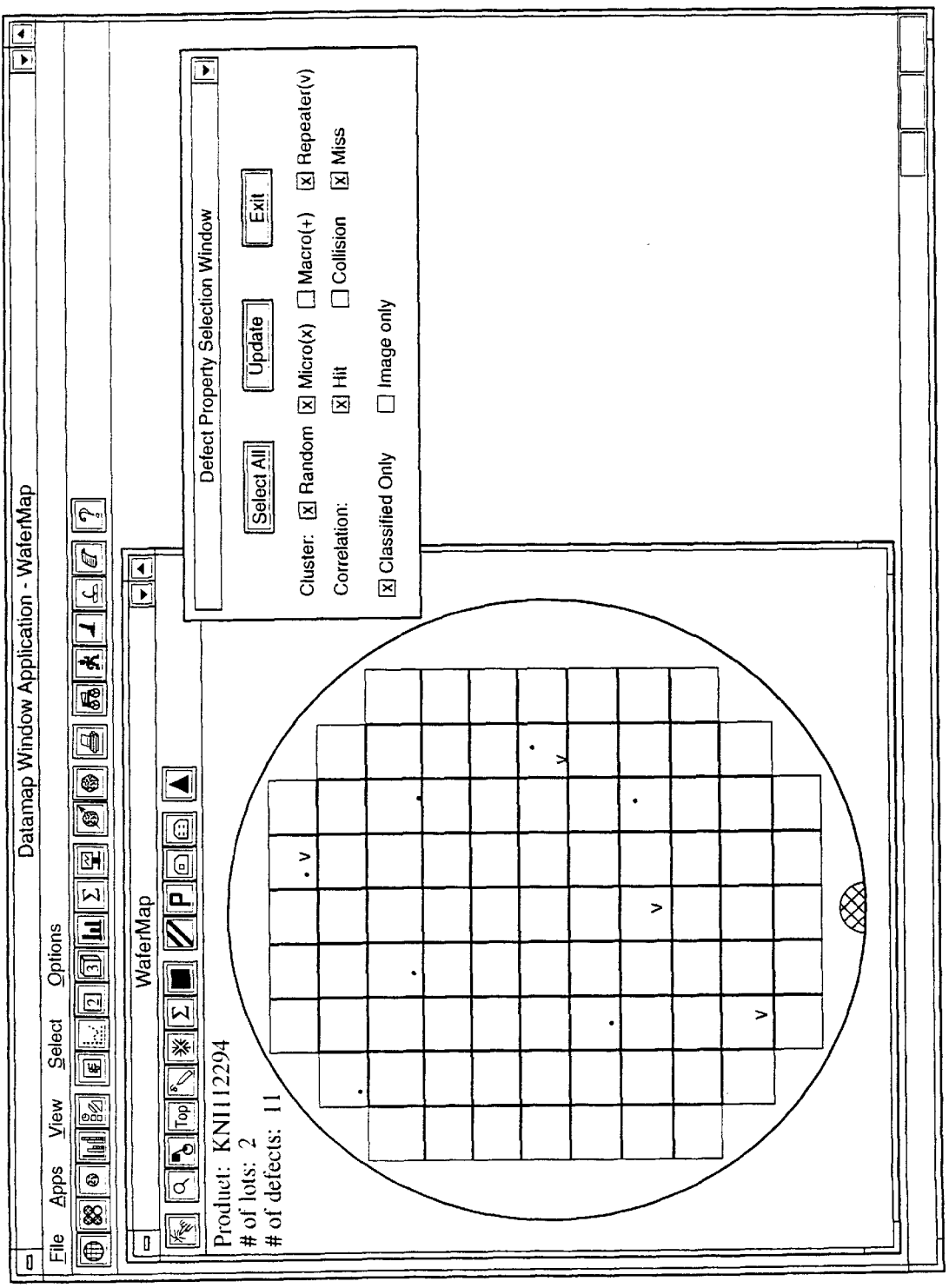
FIG._1

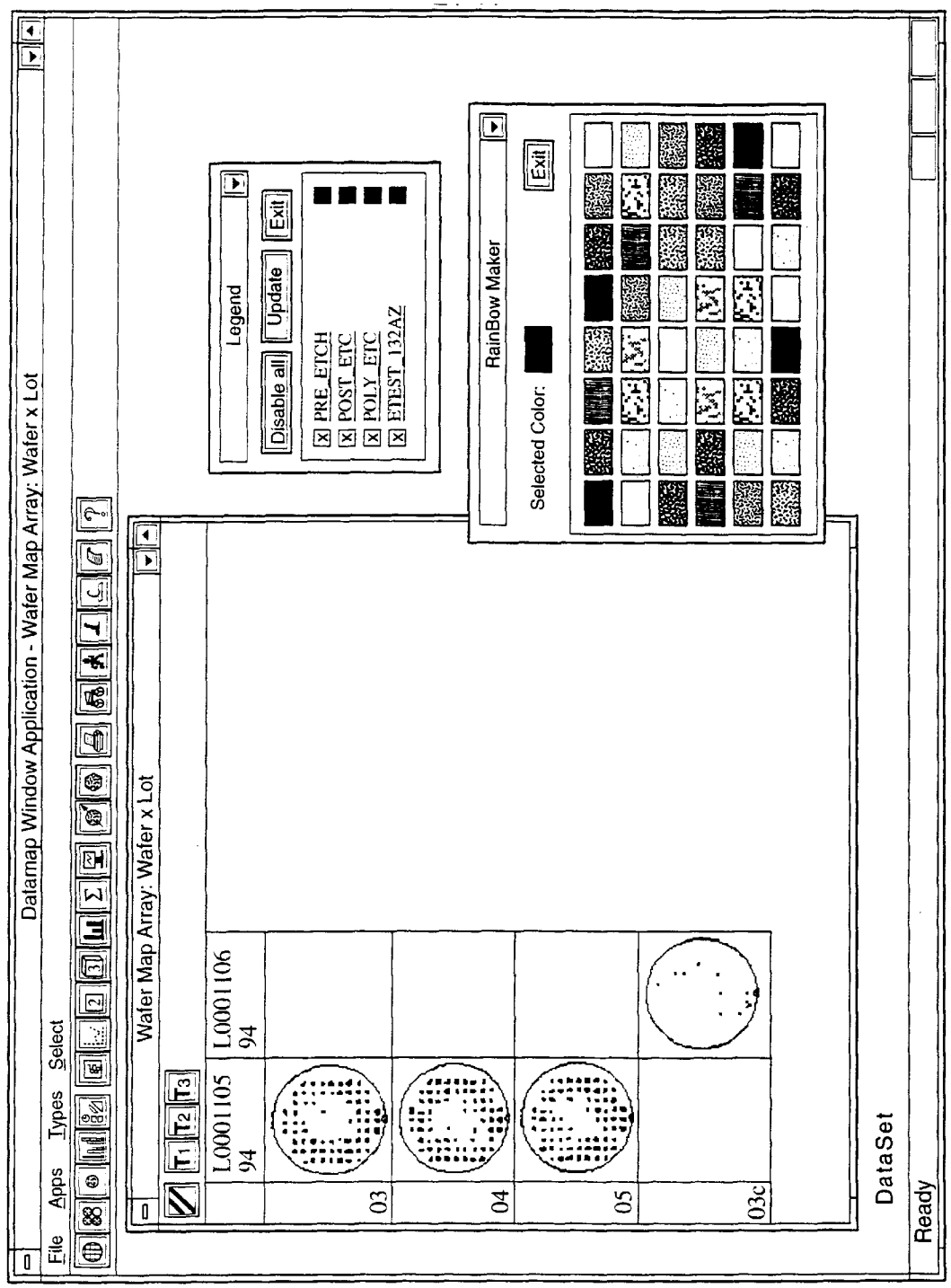
FIG._2

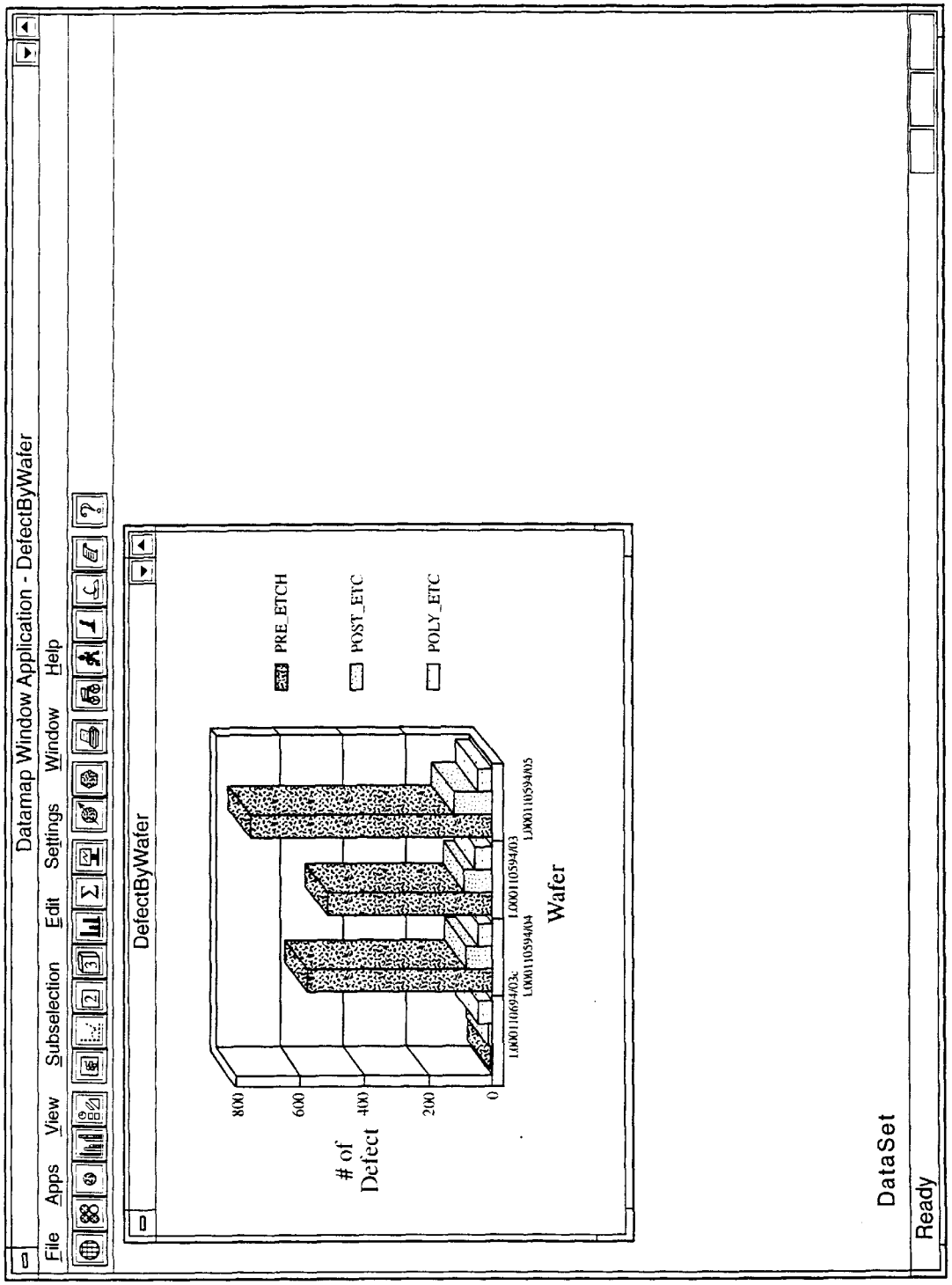
FIG._3

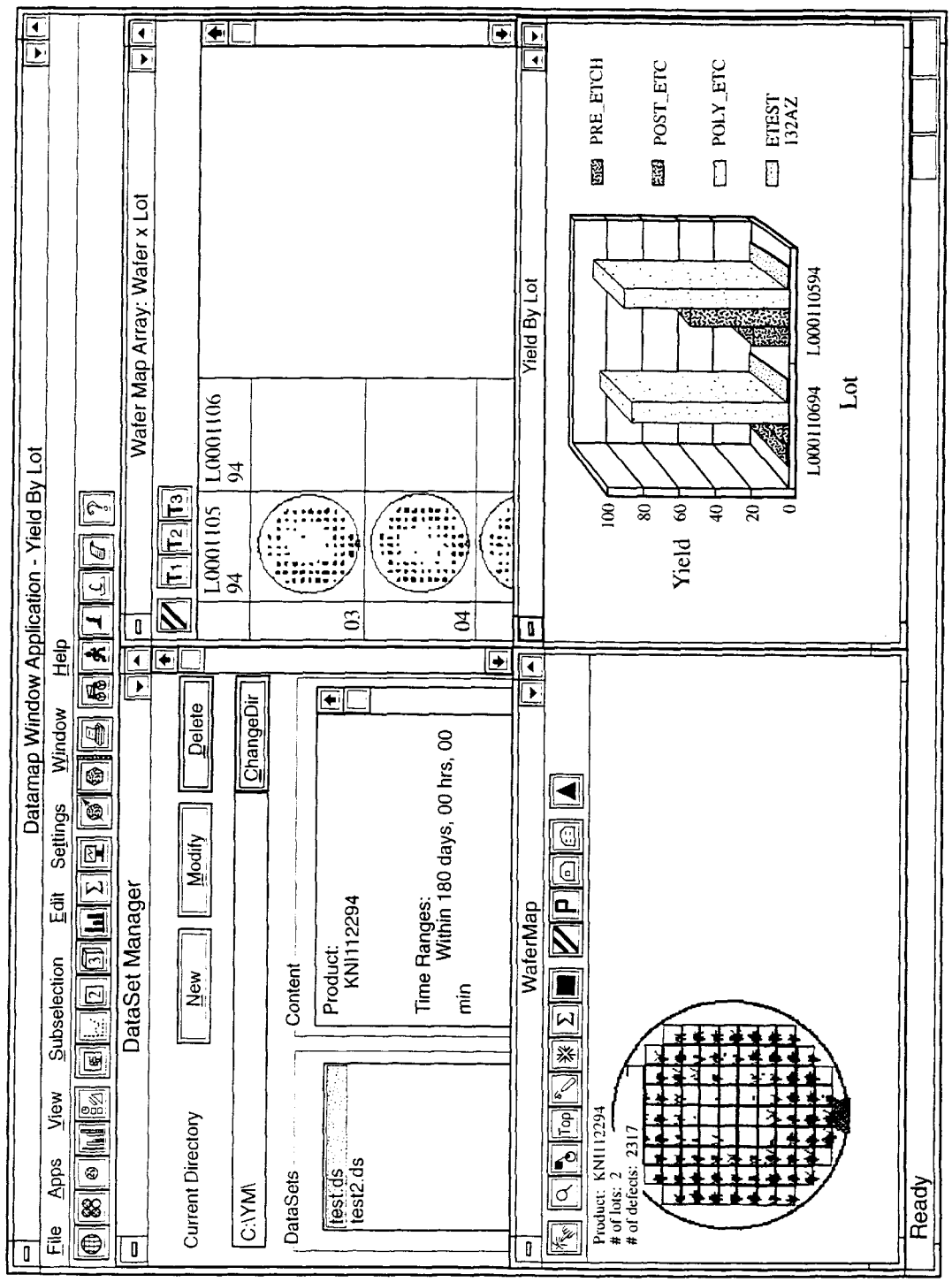
FIG._4

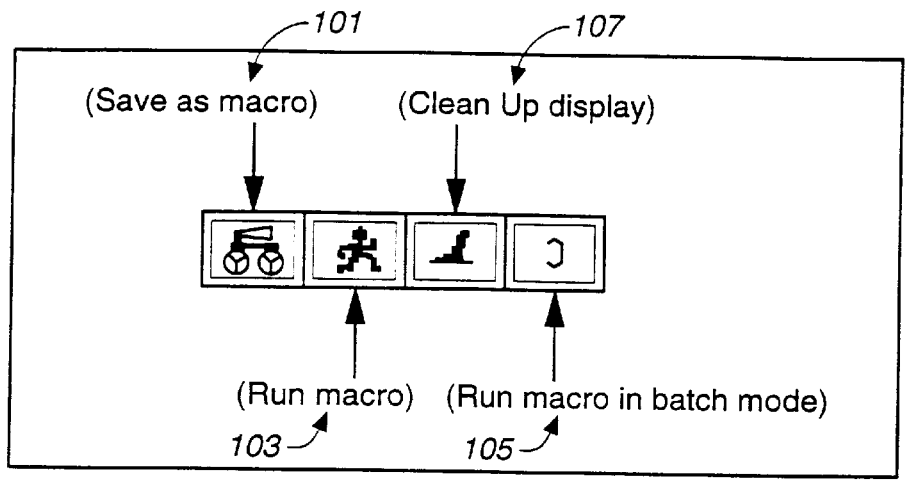
FIG._5
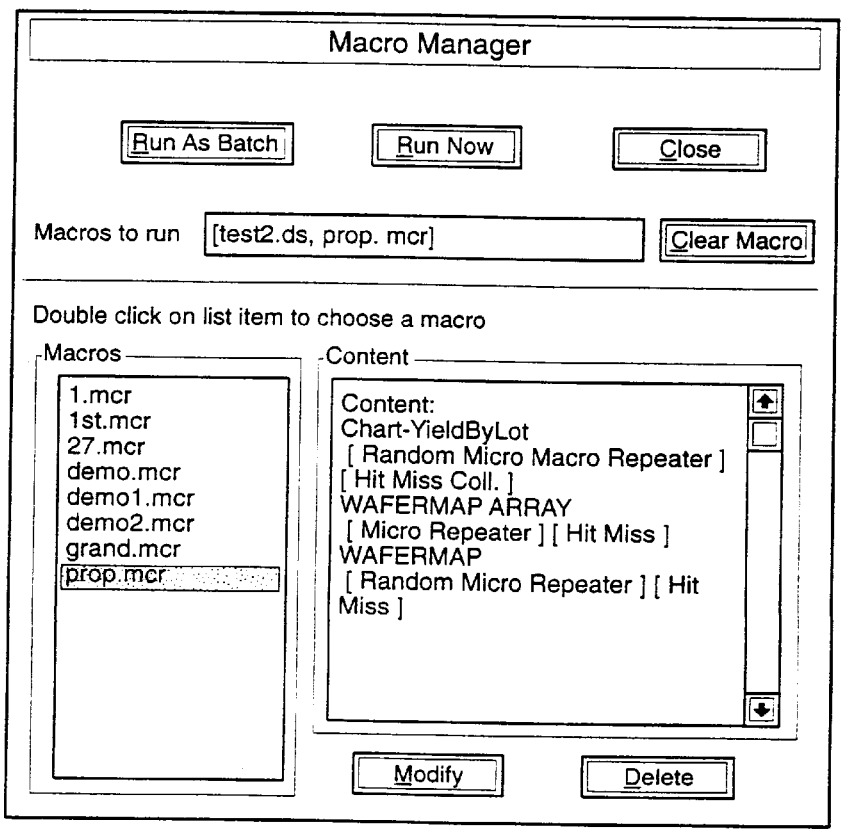
FIG._6

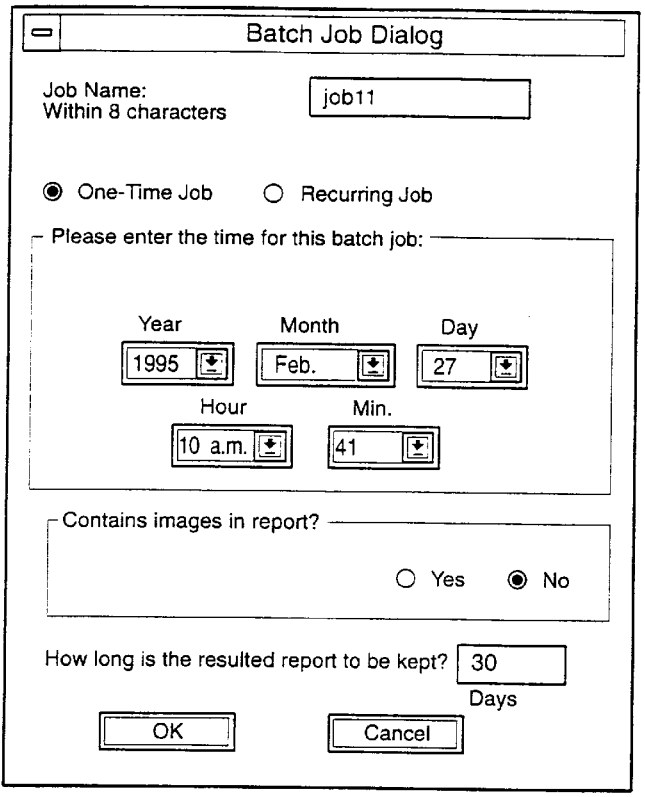
FIG._7
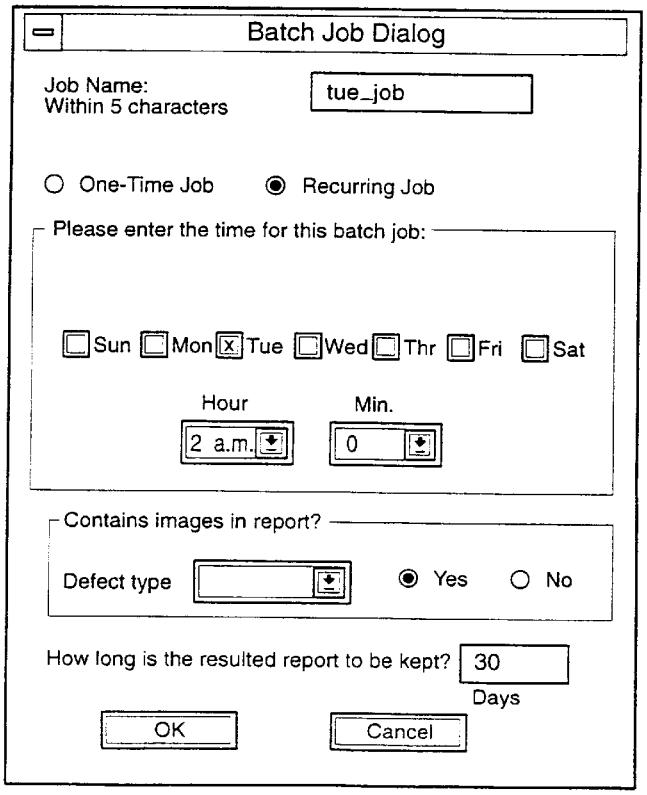
FIG._8

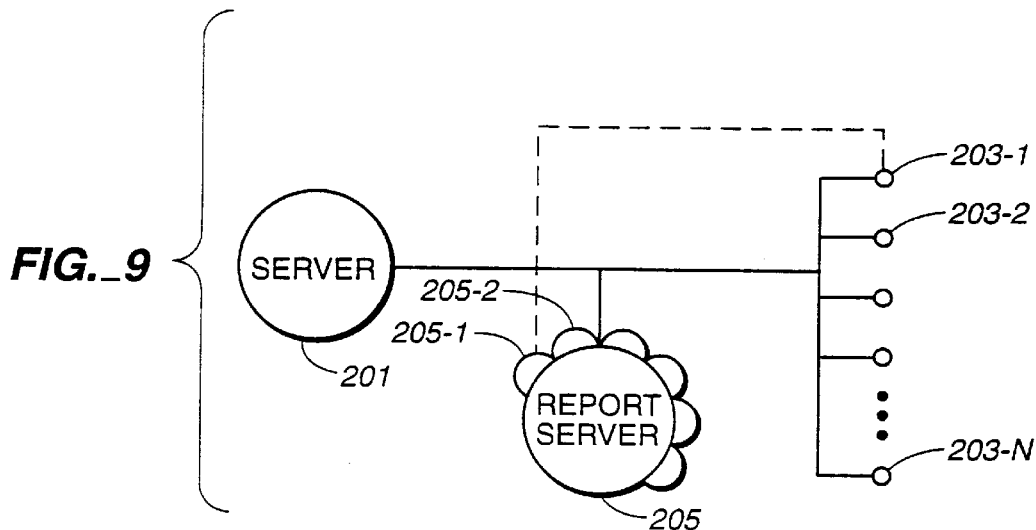
FIG._9
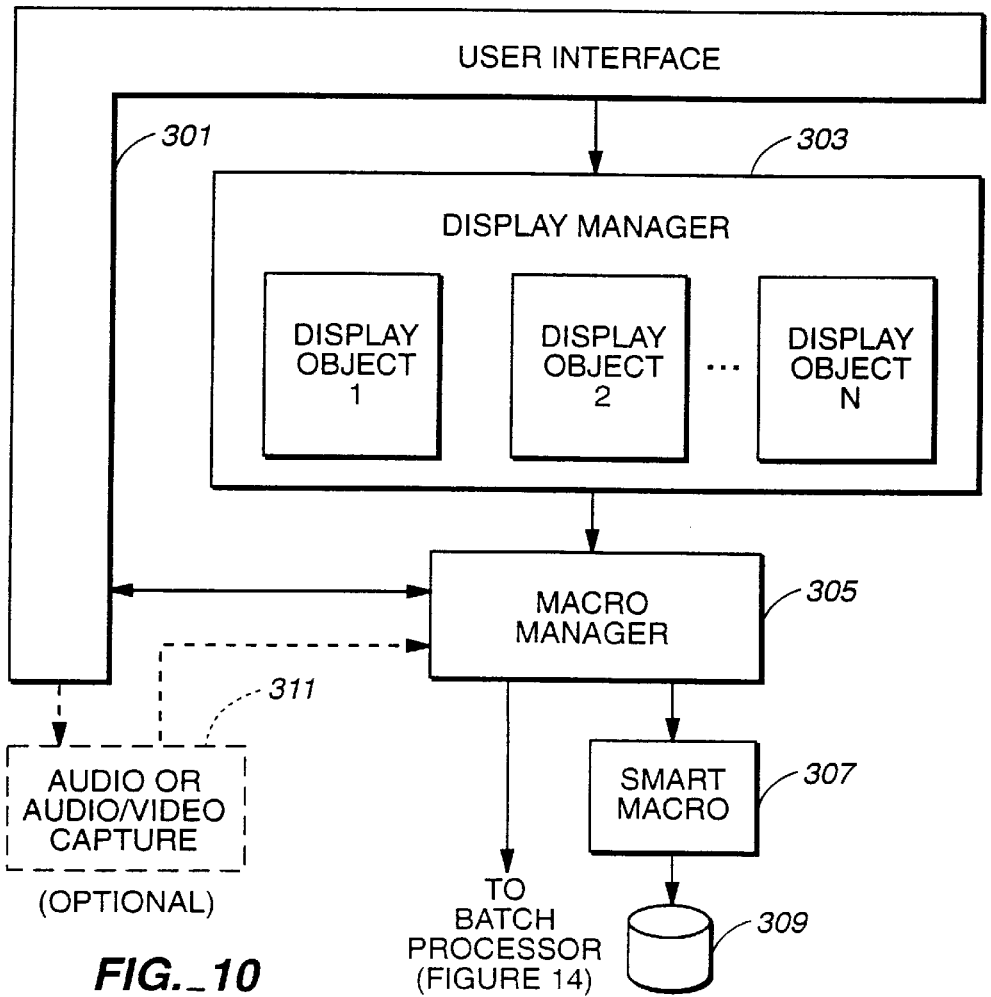
FIG._10

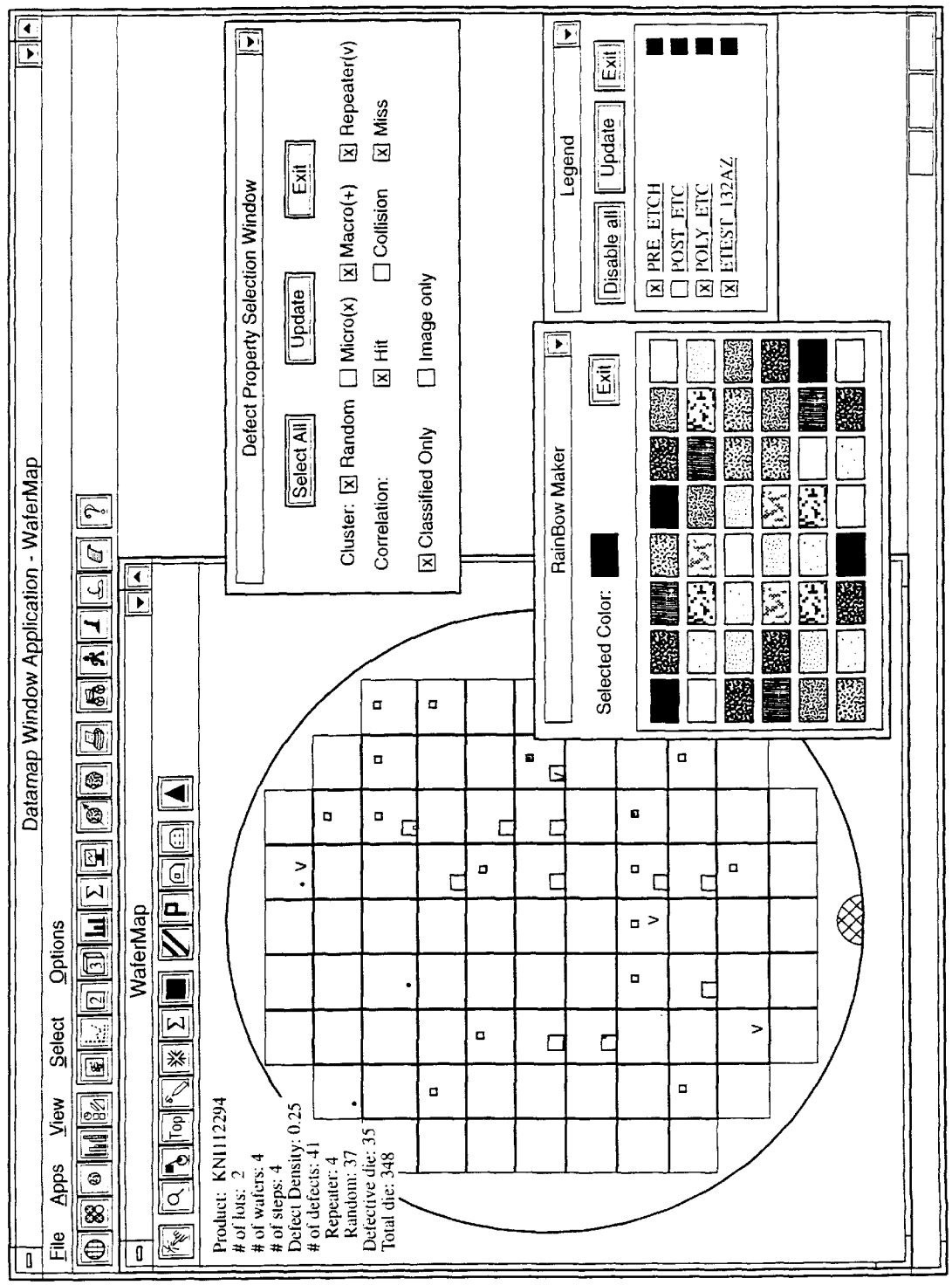
FIG._11

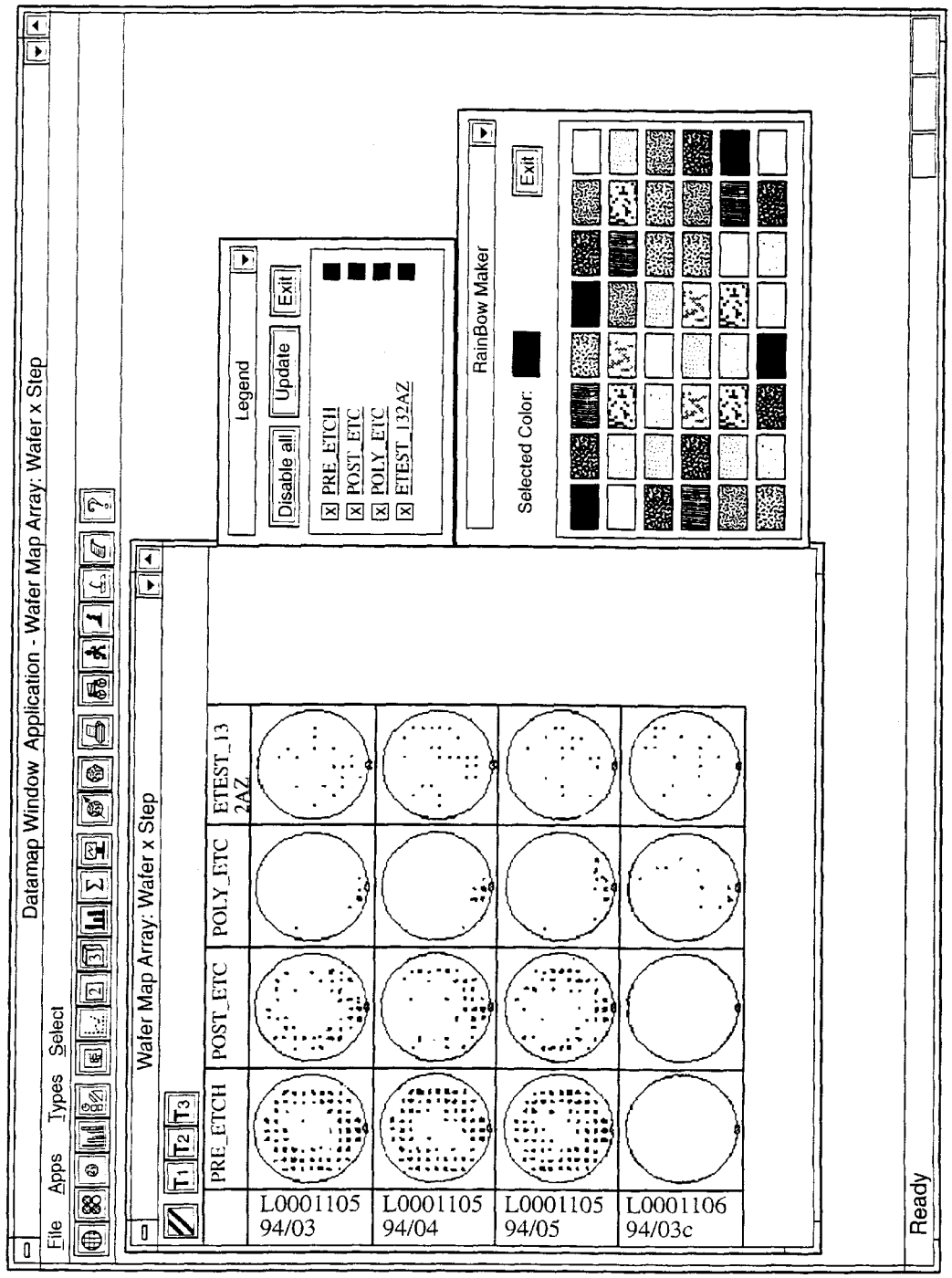
FIG._12

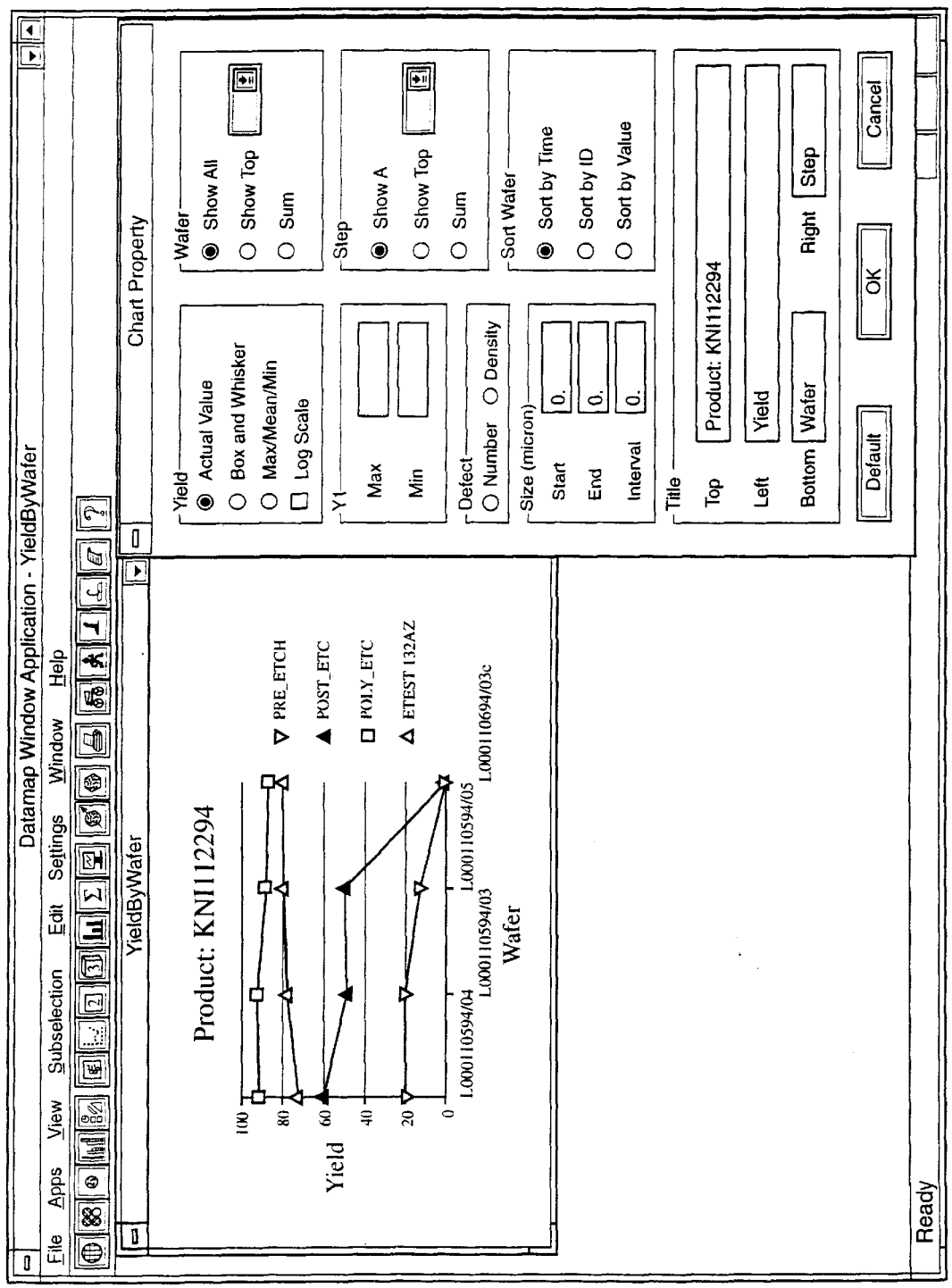
FIG._13

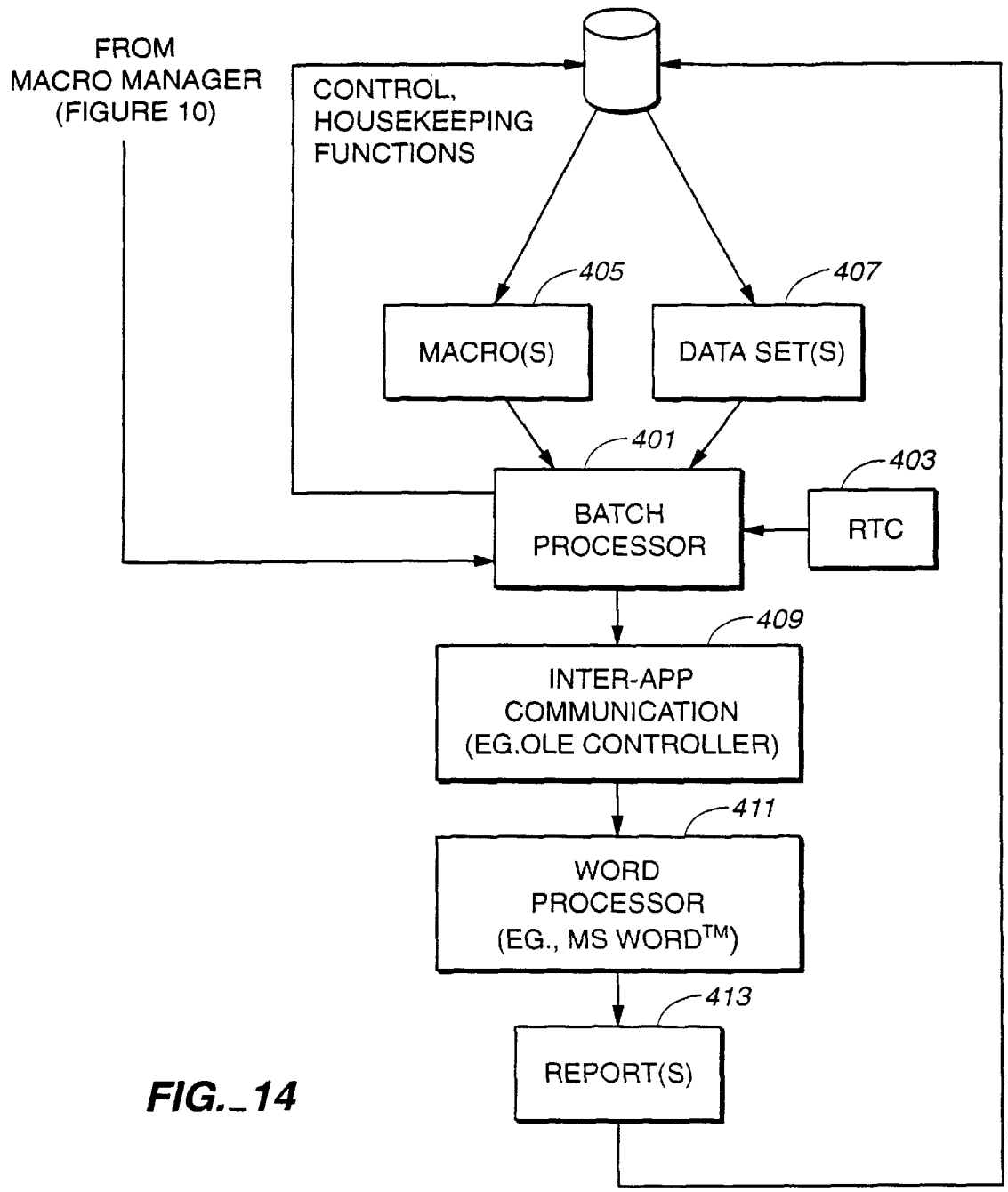
FIG._14

METHOD OF AUTOMATING THE MANIPULATION AND DISPLAYING OF SETS OF WAFER YIELD DATA USING A USER INTERFACE SMART MACRO

This application is a continuation, of application Ser. No. 08/744,557, filed Nov. 6, 1996, abandoned which is a FWC of Ser. No. 08/403,146, filed Mar. 13, 1995 abandoned.

BACKGROUND OF THE INVENTION

1. Field of the Invention

The present invention relates to information automation, particularly in the field of yield enhancement software.

2. State of the Art

Semiconductor integrated circuits, or "chips," continue to become increasingly sophisticated and complex with advances in lithography, process technology, and fabrication techniques. As integrated circuits become more complex, the potential for poor yields increases. Yield refers to the proportion of defect-free chips to total chips produced. The need has therefore become apparent for equally-sophisticated software tools for managing yields during chip production.

One such tool, known as Yield Manager™, is available from the current assignee. Yield Manager™ is a client-server application that combines a data-acquisition front end with a statistical tools package and a graphical user interface that allows users to quickly and easily retrieve any of a wide variety of data sets and manipulate and display those data sets in various fashions. Typically, the data sets are data representing the location and extent of defects on a wafer, obtained, for example, from defect metrology, review and classification systems of a type available from, for example, KLA Instruments of San Jose, Calif., or Tencor Instruments of Mountain View, Calif.

Most commonly, Yield Manager™ is used to manipulate and display data sets in three principal ways, as a wafer map, as a wafer map array, or as a chart. A wafer map, shown in FIG. 1, displays as if on a single wafer locations of defects throughout a wafer lot. Different types of defects may be indicated in different ways. A wafer map array, shown in FIG. 2, displays locations of defects throughout a wafer lot but at various stages in the production process. A wafer map array is therefore like a collection of wafer maps each of which delimited in time. A chart, shown in FIG. 3, is typically a plot, used, for example, to show a yield curve.

Apart from selecting a data set to display, the user is allowed to manipulate each of the foregoing types of displays in various ways. For example, once a wafer map or a wafer map array has been created, the user may further filter data by selecting only certain defects, for example random defects, "micro-clusters," "macro-clusters," "repeaters," etc. Charts may be formatted in various ways, for example as line graphs, 2-D bar charts, 3-D bar charts, etc.

Despite the wide variety of data manipulations available, a particular user may tend to repeatedly use Yield Manager™ to generate the same information in the same way as on a preceding occasion but using a different data set. In doing so, the user "tunes" the displays of Yield Manager™ for the user's particular preferences and circumstances. An example of one possible display that might result from tuning to account for user preferences and circumstances is shown in FIG. 4.

Currently, such tuning is performed repeatedly at each use. For example, a production supervisor may arrive at work each day at 8:00 AM and use Yield Manager™ to present various information concerning a most-recent production run by selecting the pertinent data set and tuning the displays of Yield Manager™ to display the information in the desired manner. Bringing up the application, selecting the data set, and tuning the displays of the application, although very easy, can still consume minutes of time that might be more profitably spent in actual analysis and troubleshooting.

It has therefore been proposed to augment the capabilities of Yield Manager™ by providing an automatic report generator that allows for both attended and unattended report generation, producing a word-processor-like document capable of containing text results, images, charts and graphs—basically any resulting output that can be generated by Yield Manager™. According to this proposal, results would be saved in a standard work processor format such as Microsoft Word for Windows™, allowing all of the different text, images, charts, graphs, etc., to be copied to the clipboard and transferred to another application such as Powerpoint™, Excel™, etc. To economize on storage requirements, the user would be required to specify how long the report should be saved and would have the option of excluding from the report actual bitmapped of defects (also available in Yield Manager™). Further according to the proposal, clicking on a field contained on each page of the report would select the dataset contained in the results on that page and return the user to an interactive window back in Yield Manager™ so that the user could graphically subselect data, further manipulate the data, etc. Although the foregoing proposal identifies a desired result, it gives no indication of how that desired result is to be achieved.

One commonplace approach to information automation involves the use of "keystroke macros," used herein to refer to macros in which a sequence of user inputs, typically keyboard inputs but in some instance mouse inputs or a combination of keyboard and mouse inputs. Keyboard macros are commonly used in both text-based applications (for example, Microsoft Word™) as well as graphics-based applications. One example of a graphics-based application that makes extensive use of keystroke macros is Statsoft's Statistica™. Statistica™ is an integrated data analysis, graphics and database management system. To use a keystroke macro, the user clicks a record button, enters keystrokes or mouse inputs in a sequence to be played back at a later time, and then clicks a stop button. When the macro is played back at a later time, a result is produced that is the same as a result that would have been produced had the user manually entered the exact same sequence of inputs. Keystroke macros are therefore low-level, "unintelligent" macros.

Keystroke macros are of very limited use for achieving information automation using an application such as Yield Manager™. Because keystroke macros are unintelligent, if the program context changes, running the macro does not produce the desired result, and in fact often produces unintelligible results. A context change may be as simple as moving or resizing a window. In particular, in Yield Manager™, the what is displayed to the user is a collection of display objects, managed by a display manager. Objects are frequently added and removed. Furthermore, in Yield Manager™, a good deal of the application's functionality is not keyboard accessible but is accessible only using the mouse. The recording of mouse movements and clicks in a keystroke macro is particularly error prone. For example, if a context change has occurred in which a window has been resized or moved, a mouse click that was located in a one button region in a previous context.

A need therefore exists for improved methods of automating the generation of information using context-rich applications such as Yield Manager™.

SUMMARY OF THE INVENTION

The present invention, generally speaking, addresses the foregoing problem by providing an intelligent, state-based macro facility (as opposed to the unintelligent keystroke macro facilities typical of the prior art). Instead of a record time and an end time, an intelligent, state-based macro, or "smart macro," has only a single "capture" time, determined by the user pressing a single "smart macro" key. The state of the application, including objects displayed and various properties or attributes of those objects, is then captured and stored under a name supplied by the user. That same state may then be applied to different data to produce the same kinds of results. The smart macro may be applied interactively by the user to different data, or different data sets. Even more advantageously, a batch job may be scheduled, in which the smart macro is scheduled to run on specified data at a specified time with the results being saved to disk under a user-specified name. Batch jobs may be scheduled as one-time jobs or recurring jobs. If desired, the capability may be provided to add time-based information streams, such as sound or even video, to the smart macro, with a time-based information stream object being embedded in the resulting document. In Yield Manager™, for example, instead of annotating a report or attaching a later cover sheet or explanatory note to a report, a voice recording may be added to the report, for example, explaining its significance.

BRIEF DESCRIPTION OF THE DRAWING

The present invention may be further understood from the following description in conjunction with the appended drawing. In the drawing:

FIG. 1 is a screen display including a wafer map displaying locations of defects throughout a wafer at a particular stage in the production process;

FIG. 2 is a screen display including a wafer map array displaying locations of defects throughout a wafer at various stages in the production process;

FIG. 3 is a chart displaying the number of defects by wafer lot;

FIG. 4 shows the wafer map of FIG. 1, the wafer map array of FIG. 2, and the chart of FIG. 3 following user manipulations, such as selecting data filtering options, etc.

FIG. 5 is a screen display of a macro manager, used to select, view and run macros;

FIG. 6 is a more detailed view of the toolbar macro buttons shown in FIG. 4;

FIG. 7 is a screen display of a batch job dialog box, used to schedule a job involving running of a macro, in which a recurring job button has been selected;

FIG. 8 is a screen display of a batch job dialog box, used to schedule a job involving running of a macro, in which a one-time job button has been selected;

FIG. 9 is a block diagram of a system in which the present invention may be used;

FIG. 10 is a block diagram used to explain how a smart macro may be created;

FIGS. 11, 12 and 13 are screen displays showing examples of properties that may be saved in a macro for wafer maps, wafer map arrays, and charts, respectively; and FIG. 14 is a block diagram used to explain how a smart macro may be used to automatically generate reports at scheduled times.

DETAILED DESCRIPTION OF THE PREFERRED EMBODIMENTS

For concreteness, the present invention will be described in relation to Yield Manager™, described previously. It should be understood, however, that the invention, although believed to be of particular utility in the area of yield enhancement, is of general applicability both in the area of yield enhancement and outside the area of yield enhancement, and is not dependent on the details of Yield Manager™ or any particular application program.

The smart macro of the invention may be used in conjunction with an automatic report generator, provides for the unattended generation (as well as attended generation, if desired) of report results in a word-processor-like format. The report is capable of containing text results, images, charts and graphs, and essentially any resulting output that can be generated by Yield Manager™ or another source program.

Referring again to FIG. 4, an example of one possible display that might result from tuning to account for user preferences and circumstances. As explained previously, despite the wide variety of data manipulations available, a particular user may tend to repeatedly use Yield Manager™ to generate the same information in the same way as on a preceding occasion but using a different data set. In doing so, the user "tunes" the displays of Yield Manager™ for the user's particular preferences and circumstances.

The user may save the results of the tuning process for later reuse on the same or different data set. In the illustrated embodiment, a macro is saved by clicking on a button 101, shown in greater detail in FIG. 5. The button 101 in effect takes a snapshot of the current set of wafer maps, wafer arrays, charts, and (optionally) chart reports and save the current state of these objects as a macro file. A pop-up window is then displayed for the user to specify a filename.

Related buttons 103, 105 and 107 are displayed along side the button 101. The button 101 runs a selected macro on a selected data set, displaying the results. The button 105 runs a macro in batch mode. The button 107 clears all windows (except for a dataset manager window).

When the button 103 is selected, a window such as the window shown in FIG. 6 is displayed. This window is used to select one or more macros to be run on a currently-selected data set (data set "test2.ds" in the present example). A macro is selected by double clicking on a list item within a list a macros. Selecting a macro causes the content of the macro to be displayed in an adjacent portion of the window. In the present example, a macro "prop.mcr" (corresponding generally to the display of FIG. 4) has been selected, consisting of a chart (YieldByLot), a wafer map array, and a wafer map, together with the state of each, i.e., the properties of each at the time the macro was recorded. These properties may be modified, if desired, by clicking a Modify button, or elements of the macro may be deleting by selecting the corresponding element and clicking a Delete button.

As macros are selected, they are displayed in the box labeled "Macros to run." A macro may be deselected, or cleared, by selecting that macro and clicking a Clear Macro button. When the user is satisfied with the macros to be run, the user clicks either a button labeled Run Now, to run the macro now, or a button labeled Run As Batch to schedule running of the macro as a job to be executed at one or more future times.

When the Run As Batch button is clicked, a Batch Job Dialog box is displayed, as shown in FIG. 7 and FIG. 8. The user first enters a job name under which the job will be saved.

In FIG. 7, a one-time job has been selected. The user then specifies a time for the job to be executed, by year, month, day, hour and minute, if desired. The user is also prompted to enter selections as to whether defect images are to be included in the report and how long the resulting report is to be saved, up to a predetermined maximum, for example.

The job may be canceled by clicking a Cancel button, or may be accepted by clicking an OK button. Once the job has been accepted, it will execute automatically at the specified time unless canceled beforehand.

In FIG. 8, a recurring job has been selected. The user specifies a recurring time for the job to be executed, by day or days of the week, hour and minute, if desired. The user is again prompted to enter selections as to whether defect images are to be included in the report and how long the resulting report is to be saved, etc.

The foregoing automatic report generating facility may be used in a client-server environment, as shown in FIG. 9. In the system of FIG. 9, a main server 201 is connected by a computer network to multiple client nodes, designated as node 203-1, 203-2, etc. The server 201 may be used to store defect data on a continuous basis in a manner known in the art.

An additional report server 205 is used to schedule jobs and store report results. Preferably, each user has a separate secure partition within the server 205, indicated as 205-1, 205-2, etc.

Referring to FIG. 10, various program entities (located, for example, at each client node 203) and their interrelationships are shown. A user interface 301 prompts the user for inputs and responds to user commands in the manner described previously in relation to FIGS. 1–8. In response to user commands, the user interface calls on a display manager 303 to create appropriate displays consisting of a collection of display objects 1, 2, ..., N.

A macro manager 305 responds to user commands to capture the display state as saved within the display manager 303, thereby creating a smart macro 307, which is saved to disk 309. The properties that make up a macro may be a various kinds depending on the particular environment in which the invention is used. Within the field of yield enhancement, examples of properties that may be saved in a macro for wafer maps, wafer map arrays, and charts, are shown in FIGS. 11, 12 and 13, respectively.

Referring again to FIG. 10, the automatic report generation facility may optionally include an audio or an audio/video capture module 311. Using such a module, audio, video or other time-based information streams may be stored along with the macro 309 and played back by clicking a button within a report generated by the macro.

The macro manager 305 also interacts with a batch processor 401 seen in FIG. 14, (located, for example, at the report server 205). Referring to FIG. 14, the batch processor 401 is called on by the macro manager to schedule and execute jobs. Connected to the batch processor is a real-time clock 403. When the time specified for a job arrives, the batch processor controls other resources to execute the job. In particular, the batch processor retrieves from storage the specified macro or macros 405 and applies the macro(s) to the specified data set(s) 407. The results are sent to an inter-application communication facility, such as an Object Linking and Embedding (OLE) controller 409. The inter-application communication facility controls a separate application, e.g. a word processor 411 such as Microsoft Word™, to create one or more reports 413, which are then saved to disk. The reports, having been created by the application 411, can then be edited and shared between other compatible applications, for example Microsoft Office™ applications.

In summary, the described smart macro facility (and associated report generation facility) greatly furthers information automation. Macros are made of graphic components and are executed with run-time parameters specifying, for example, a data set. Macros may also include multimedia content, such as voice or video. The macro content is editable, and the macro running sequence is adjustable. Macros may be run in batch mode, on schedule, repetitively or non-repetitively, with a job including one macro or multiple macros. Both the macro and the result of running the macro are permanently stored for convenient retrieval. Finally, the original macro creation environment may be recovered from the report document.

It will be appreciated by those of ordinary skill in the art that the present invention may be embodied in different forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of displaying a plurality of wafer yield related data sets using a wafer yield management application tool having a user interface, said user interface including a menu of display options for displaying wafer yield related data, said method comprising the steps of:

providing a save option in said user interface menu which when selected records a macro corresponding to the current visual appearance and visual attributes of a displayed graphical representation of a selected wafer yield related data set including at least one of a yield map, a yield array, a yield chart, and a yield chart report;

selecting one of said plurality of wafer yield related data sets;

selecting a sequence of display options from the user interface and using at least one of mouse and keystroke operations so as to perform graphical functions on said one wafer yield related data set so as to generate a first display showing a first graphical representation of said one wafer yield related data set;

selecting said save option when said graphical representation of said one wafer yield related data set is displayed so as to create a macro corresponding to said first display's current visual appearance and visual attributes resulting from said sequence of display options from the user interface and said at least one of said mouse and keystroke operations;

selecting at least one other wafer yield related data set from said plurality of wafer yield related data sets;

applying said recorded macro to said other wafer yield related data set so as to generate a second display showing a subsequent graphical representation corresponding to said other wafer yield related data set and wherein said second display's current visual appearance and visual attributes are essentially the same as said first display's current visual appearance and visual attributes.

2. The method of claim 1, comprising the further step of printing said second display's graphical representation.

3. The method of claim 1 comprising the further step of storing said second display's graphical representation.

4. The method of claim 3, comprising the further step of said user specifying at least one of a type of element to be included in or excluded from said second display's graphical representation, and how long said second display's graphical representation is to be stored.

5. The method of claim 4, wherein how long said second display's graphical representation is to be stored is specified as a number of days, comprising the further step of deleting said second display's graphical representation after said number of days.

6. The method of claim 1, wherein applying said macro to said other wafer yield related data set to produce said second display's graphical representation comprises controlling from said wafer yield management application a second word processing application to generate a report representative of and including at least a portion of said second display's graphical representation in a format of said second application.

7. The method of claim 1, further comprising the step of said user specifying at least one future time wherein said applying step is performed at said future time.

8. The method of claim 6, further comprising the step of said user specifying a series of future times wherein said applying step is performed at each time in said series of future times.

9. The method of claim 1, further comprising the steps of:
capturing a time-based information stream including at least one of an audio information stream and a video information stream;
recording said time-based information stream along with said macro; and
including in said second display's graphical representation said time-based information stream and a control element allowing said time-based information stream to be played back.

* * * * *